Patented Mar. 11, 1952

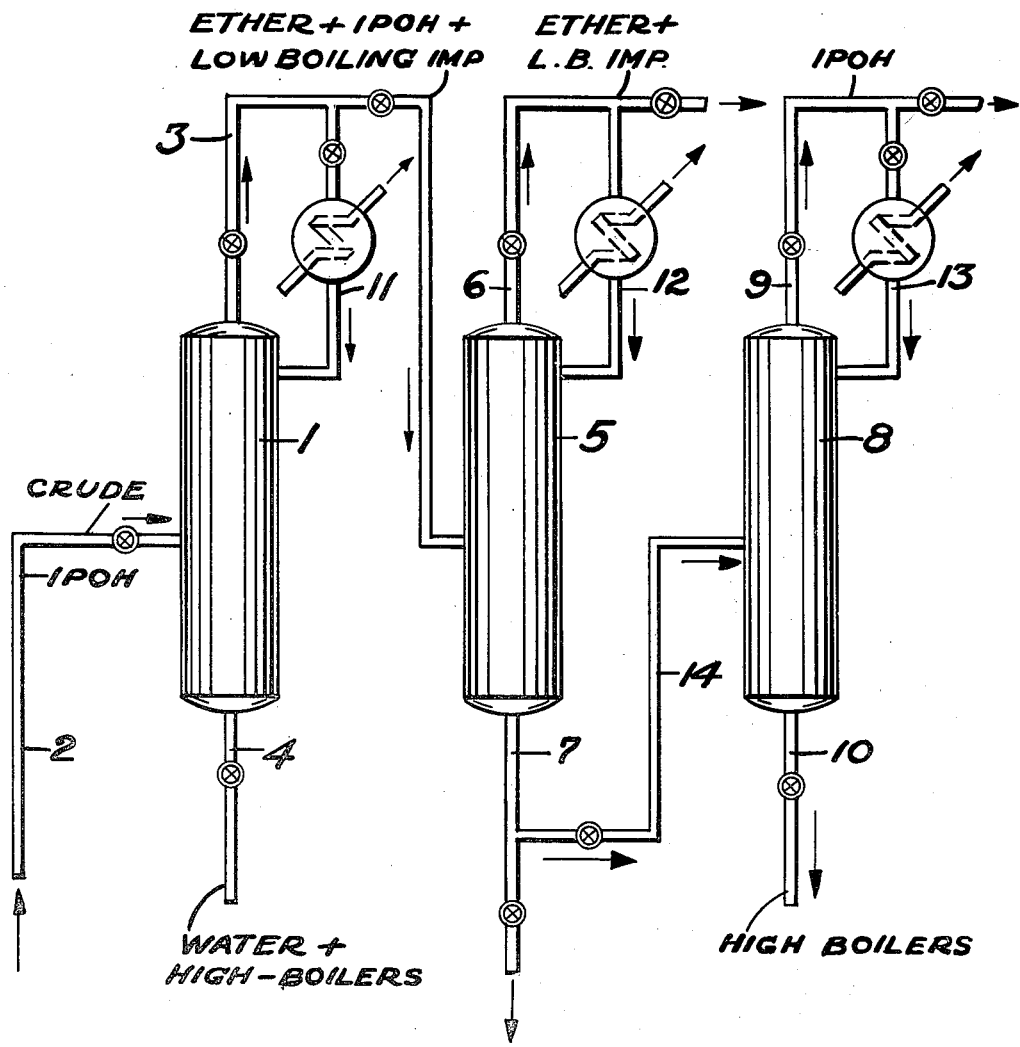

2,588,446

UNITED STATES PATENT OFFICE 2,588,446

PURIFICATION OF ISOPROPANOL

Samuel W. Wilson, Baton Rouge, La., assignor to Standard Oil Development Company, a corporation of Delaware Application June 9, 1949, Serial No. 97,962

6 Claims. (Cl. 202—57)

This invention relates to the purification of isopropyl alcohol and particularly to the production of an isopropyl alcohol of improved odor quality. Specifically, the invention relates to a process whereby malodorous isopropyl alcohol is treated to remove the malodorous impurities therefrom.

It is well known that alcohols, particularly those produced by the acid-catalyzed hydration of olefin hydrocarbons, possess a distinct and apparent foreign odor, slightly penetrating, and for the most part disagreeable. While no attempt will be made to definitely assign the disagreeable odor of alcohols prepared by olefin hydration to the presence of any one or combination of chemical compounds, it can be said with reasonable assurance that the odor of crude alcohol depends to a large extent on the quality of the olefin stream employed in the olefin hydration operation. Likewise, the odor of a refined alcohol depends to a large extent on the quality of the crude alcohol from which it is prepared.

Olefin hydrocarbons, such as those produced by the cracking of mineral oils, contain variable amounts of compounds having an obnoxious odor particularly sulfur compounds such as hydrogen sulfide, alkyl sulfides and mercaptans. These materials present, even in minute amounts, in the olefin stream to the acid catalyzed hydration process are believed to contribute to the obnoxious odor of the crude alcohol since, while sulfur alone has no smell, it is clear that in combination with other elements it is a powerful odiferous agent. The bad odor of alcohols has also attributed to the presence of so-called high-boiling polymer products formed in side reactions during the alcohol process. The odor of the polymer products is strengthened by the presence of any sulfur compounds dissolved therein, although the odor of some of the pure polymers themselves is by no means pleasing to the olfactory sense. A typical analysis of a sample of the so-called polymer product, in this case the so-called propyl oil, resulting from the production of isopropyl alcohol by the sulfuric acid catalyzed hydration of propylene is as follows:

55 wt. per cent sec.-heptanol (B. P. 137–140° C.)
21 wt. per cent sec.-octanol (B. P. 160–165° C.)
2 wt. per cent $C_7$ ketone (B. P. 131° C.)
13 wt. per cent hydrocarbons (B. P. above 180° C.)
9 wt. per cent ethers (B. P. above 160° C.)
Traces of sulfur compounds The composition of the propyl oil or so-called high-boiling polymers obtained during the concentration of dilute crude isopropanol varies according to the point from which the alcohol containing it is withdrawn in the concentrating tower, and the odor likewise varies. Cuts can be identified with an odor of camphor, of menthol, etc. It has also been reported that the presence of nitrogen compounds also contributes to the odor of alcohols.

The odor imparted to isopropyl alcohol by the propyl oil impurities is a hydrocarbon type odor. This type of odor has been found to be effectively removed by a number of methods such as by careful and repeated conventional fractionations but particularly by the water extractive distillation method as described and claimed in U. S. patent application Serial No. 24,626, filed May 1, 1948, and assigned to the present assignee. However, there is a second type of odor which is fugitive in nature and which may best be characterized as a mercaptan or thioaldehyde odor, and which, it is believed, is attributed to the presence of low boiling mercaptans or thioaldehydes which appear to be decomposition products of higher boiling impurities which break up under alcohol purification distillation conditions. It has been found that this second type of odor (hereinafter referred to as "mercaptan" odor) is particularly noticeable when the alcohol production process is operated under upset generator conditions or when the purification process is operated under upset concentrator conditions. When the capacity of the generator or concentrator is exceeded some isopropyl alcohol creeps down into the reboiler associated with the generator or concentrator wherein a high temperature prevails and where in the case of the generator a particular concentration of sulfuric acid exists. Under these conditions it is felt that the heat and/or the sulfuric acid acts as a reducing agent on the isopropyl alcohol which decomposes into lower boiling impurities, particularly mercaptan, thioether, and thioaldehyde compounds which are volatile. These impurities go overhead with the alcohol from the generator. Subsequently in the concentrator they are not all removed with the low boiling overhead, but remain in traces of parts per million in the isopropyl alcohol product which is removed as a top sidestream from the concentrator. Likewise if the concentrator conditions are upset the same decomposition occurs and the problem becomes aggravated. It has also been theorized that the second type of odor is due to the decomposition of sulfurized esters which are formed in minute amounts during the propylene absorption in sulfuric acid. These esters are thought to decompose either thermally or by hydrolysis.

Furthermore, there are indications that some of the malodorous compounds are rather strongly bound in the aqueous alcohol product in such a manner that they tend to concentrate along with the alcohol during such operations as heads removal, water extractive distillation and even regular distillation for alcohol finishing. However, the nature of the chemical reactions tending to bind these malodorous compounds is such that unstable addition compounds result and the malodorous compounds are liberated and volatilized to some extent during all alcohol finishing operations of the types described. For instance, in typical alcohol finishing operations the following problems are encountered. Crude alcohol, after passing through the heads operation to remove ether and other low boilers, is fed to a finishing column in which certain low boiling materials are taken overhead with a purified alcohol taken as a sidestream. Materials contributing to "mercaptan" odor appear to be lower boiling than the alcohol proper but are nevertheless not completely removed from the alcohol sidestream. This result is believed to be due in large part to the fact that decomposition reactions liberating low boiling malodorous compounds occur during the distillation, allowing these malodorous compounds to pass overhead. Similar difficulties are encountered when applying water extractive distillation to the same crude alcohol. In fact, water extractive distillation appears to concentrate the compounds giving rise to "mercaptan" odor along with the alcohol so that, in the final alcohol finishing operation, an alcohol product high in "mercaptan" odor is obtained. This seems to be particularly true of isopropyl alcohol prepared by the so-called weak acid method as described below.

It has been found that the quality of refined isopropanol can be improved by a process called "reverse distillation" performed upon the crude aqueous isopropanol particularly when the crude isopropanol is kept at a pH on the basic side.

In the normal finishing of crude aqueous isopropanol the crude alcohol is distilled in a first column called the "heads" column, where ether and other low-boiling impurities are separated overhead. The dilute alcohol is then led to a concentrating column where 91% isopropanol in the form of a water azeotrope is removed overhead from water and the high boiling impurities. In the "reverse distillation" operation the crude alcohol is distilled in a first column from which ether, low-boiling impurities and isopropanol-H₂O azeotrope are removed overhead while the bottoms comprise water and high-boiling impurities. The overhead is then led to a second column, which now acts as a heads column, in which the ether and low-boiling impurities are taken overhead from the alcohol-H₂O azeotrope. Any remaining high-boilers in the alcohol may be removed in a third column if necessary.

Crude isopropyl alcohol may be produced by the sulfuric acid catalyzed hydration of propylene by the weak acid method or the strong acid method. In the former process a relatively rich propylene stream containing about 50–80 volume per cent propylene is absorbed in sulfuric acid of approximately 60 to 80 weight per cent concentrations, preferably 70 weight per cent, at about 170° F. and approximately 250 p. s. i. g. pressure to form an extract comprising isopropyl sulfate which is partially hydrolyzed to alcohol during the absorption. The hydrolysis is completed by dilution of the extract with water to approximately 45 weight per cent acid strength and maintaining the extract at a temperature of about 190° F. for a period of about 10 minutes' residence time. The hydrolysis products are then distilled in an alcohol generator wherein crude alcohol vapors are removed overhead and condensed, and wherein spent sulfuric acid is recovered as bottoms for reconcentration and subsequent re-use in the absorption process. The crude isopropyl alcohol contains approximately 30–60% by volume of isopropyl alcohol, some impurities including hydrocarbons, isopropyl ether, acetone and unknown impurities, and the balance water. The crude alcohol is condensed and cooled and is ready for the purification stage of the process.

In the strong acid process a propylene stream of relatively lower propylene content, i. e., about 30–60 volume per cent propylene is contacted under similar conditions with a stronger sulfuric acid, e. g., acid of 80–95 weight per cent concentration, preferably 85–88 weight per cent, whereby an extract is formed as above. The extract goes through a similar hydrolysis and stripping treatment to produce a crude isopropyl alcohol as described for the weak-acid process.

When the isopropyl alcohol is purified by conventional fractionation it is led to a heads column the purpose of which is to remove ether and other low-boiling water-insoluble impurities, such as hydrocarbons, hydrocarbon polymers, oxygenated compounds, and unknown impurities. This is accomplished by a steam stripping operation whereby the lighter materials are withdrawn overhead while weak aqueous alcohol is recovered as bottoms. The weak aqueous alcohol is then distilled in a concentrating column where the alcohol is concentrated to a composition approaching its water azeotrope, viz., 91 volume per cent isopropyl alcohol–9 volume per cent water. The alcohol of azeotropic composition may be further distilled for removal of acetone if present, or concentrated further to 95 volume per cent or 99 volume per cent isopropyl alcohol if desired.

The process of this invention will be more clearly understood from the attached drawing which represents a semidiagrammatic elevational sketch of one type of apparatus for carrying out the process.

Referring to the drawing numeral 1 represents a distillation tower to which crude malodorous aqueous isopropanol of the type previously described is introduced via line 2. The pH of the crude alcohol is preferably adjusted to the basic side before the distillation is initiated. This may be done by any of the conventional means such as by addition of caustic soda, caustic potash, the water-soluble alkali and alkaline earth carbonates, basic salts, organic bases such as the amines, etc., by addition of ammonia, etc. The pH may be adjusted by treatment of the crude alcohol feed before it enters the tower 1 or it may be adjusted thereafter and controlled at the proper pH by addition of caustic to the tower or via the reflux line 11, etc. This invention is not limited by any manner in which the pH is controlled provided it is always kept on the basic side. Heat is applied to the tower by conventional means such as open steam but preferably by means of a reboiler (not illustrated). Sufficiently high temperature is maintained to take overhead via line 3 isopropyl ether, low-boiling impurities such as acetone, hydrocarbons, hydrocarbon polymers, etc. and the isopropanol in the form of its water azeotrope. The bottoms removed via line 4 comprise water and the high-boiling impurities. Part of the overhead may be condensed and refluxed to the tower 1 via line 11. The overhead from tower 1, with or without prior condensation, is then conducted to distillation column 5 which serves as a "heads column" to remove overhead via line 6 the ether and other low-boiling impurities, including malodorous bodies, leaving as bottoms the purified isopropanol-water azeotrope which is removed via line 7 to storage. Part of the overhead from tower 5 may be condensed and refluxed to column 5 via line 12. If the alcohol bottoms from column 5 still contain some high-boiling impurities the alcohol is led to column 8 wherein the alcohol is distilled overhead as the azeotrope via line 9. Conventional reflux may be made of the condensed distillate via line 13. High-boilers are removed as bottoms via line 10.

The following runs demonstrate the effectiveness of the "reverse distillation" procedure on the basic crude alcohol for the removal of "mercaptan" odor. The distillations represent the results of heads column runs carried out on a number of successive alcohol overhead cuts obtained by reverse distillation of crude isopropanol as described in the above process. The heads column was operated at a 5:1 reflux ratio. The pH of the alcohol was adjusted with caustic soda.

TABLE

*Finished IPOH after heads removal in second column*

| pH | Basic | Basic | Acidic | Basic | Basic | Basic | Basic |
|---|---|---|---|---|---|---|---|
| Cut #1 | 3 MO [1] | NMO [2] | 4 MO | NMO | NMO | NMO | NMO |
| Cut #2 | 3 MO | NMO | 4 MO | NMO | NMO | NMO | NMO |
| Cut #3 | NMO | NMO |  | NMO | NMO | NMO | NMO |
| Cut #4 | NMO | NMO | 3 MO | NMO | NMO | NMO | NMO |
| Cut #5 | NMO | NMO | 3 MO | NMO | NMO | NMO | NMO |
| Cut #6 | NMO | NMO | 2 MO | NMO | NMO | NMO | NMO |
| Cut #7 | NMO | NMO | 2 MO | NMO | NMO | NMO | NMO |
| Cut #8 | NMO | NMO | 2 MO | NMO | NMO | NMO | NMO |
| Cut #9 | NMO | NMO | 2 MO | NMO | NMO | NMO | NMO |
| Cut #10 | Hydrocarbon Odor. | NMO | NMO | NMO | NMO | NMO | NMO |

[1] MO=mercaptan odor, graded from 1 to 4; the higher the numeral the greater the mercaptan odor.
[2] NMO=no mercaptan odor.

The data illustrate that "mercaptan" odor is substantially eliminated by the reverse distillation of the crude particularly at basic pH's. Although some improvement in "mercaptan odor" is obtained when the process of reverse distillation is applied to a crude alcohol which contains acid as evidenced by the reduction in "mercaptan odor," complete removal of "mercaptan odor" is not obtained. It is therefore preferred to maintain the crude isopropanol at a basic pH preferably in the neighborhood of 7.5 to 9.5.

What is claimed is:

1. A process for the production of highly refined isopropanol of improved odor quality from crude aqueous isopropanol prepared by the sulfuric acid-catalyzed hydration of propylene and containing low-boiling and high-boiling impurities including malodorous bodies giving rise to "mercaptan" odor which comprises adjusting the pH of the crude alcohol to the basic side, distilling the basic crude alcohol in a first distillation zone to remove the low-boiling impurities and isopropanol overhead from the high-boiling impurities and water, conducting the distillate from the first distillation zone to a second distillation zone, removing low-boiling impurities including malodorous bodies giving rise to "mercaptan" odor overhead from the second distillation zone and recovering highly refined isopropanol free of malodorous bodies as bottoms from the second distillation zone.

2. A process according to claim 1 in which the pH of the crude alcohol is adjusted to the basic side by the addition of caustic soda.

3. A process according to claim 1 in which the pH is maintained in the range of 7.5 to 9.5.

4. A process for the production of highly refined isopropanol from crude aqueous isopropanol prepared by the sulfuric acid-catalyzed hydration of propylene, said crude alcohol containing low-boiling and high-boiling impurities including malodorous bodies giving rise to "mercaptan" odor which comprises, adjusting the pH of the crude alcohol to the basic side, distilling the basic crude alcohol in a first distillation zone to remove the low-boiling impurities and isopropanol overhead from the high-boiling impurities and water, conducting the distillate from the first distillation zone to a second distillation zone, removing low-boiling impurities including malodorous bodies overhead from the second distillation zone and recovering highly refined isopropanol free of malodorous bodies as bottoms from the second distillation zone.

5. A process according to claim 4 in which the pH of the crude alcohol is adjusted to the basic side by the addition of caustic soda.

6. A process according to claim 4 in which the pH is maintained in the range of 7.5 to 9.5.

SAMUEL W. WILSON.

REFERENCES CITED

The following references are of record in the file of this patent:

UNITED STATES PATENTS

| Number | Name | Date |
|---|---|---|
| 1,600,437 | Taveau | Sept. 21, 1926 |
| 1,614,877 | Clapp | Jan. 18, 1927 |
| 1,702,495 | Clapp | Feb. 19, 1929 |
| 1,933,505 | Merley | Oct. 31, 1933 |
| 1,995,597 | Archibald et al. | Mar. 26, 1935 |
| 2,080,064 | Roelfsemg | May 11, 1937 |
| 2,080,111 | Bump | May 11, 1937 |
| 2,470,222 | Patterson | May 17, 1949 |